(12) United States Patent
Lake et al.

(10) Patent No.: US 6,617,004 B2
(45) Date of Patent: Sep. 9, 2003

(54) MULTI-PURPOSE ABSORBENT AND CUT-RESISTANT SHEET MATERIALS

(75) Inventors: Kirk Wallace Lake, Cincinnati, OH (US); Peter Worthington Hamilton, Cincinnati, OH (US); Nicole Alisa Renee Lockett, Cincinnati, OH (US); James Edward Poland, Park Hills, KY (US); Charles John Gilfert, Cincinnati, OH (US); Mario Alonso, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/905,802

(22) Filed: Jul. 13, 2001

(65) Prior Publication Data

US 2003/0064194 A1 Apr. 3, 2003

(51) Int. Cl.⁷ .................................. B32B 3/24
(52) U.S. Cl. .................. 428/138; 428/131; 428/198; 428/911; 442/33; 269/289 R
(58) Field of Search ................ 428/198, 131, 428/138, 911; 442/33; 269/289 R (56) References Cited

U.S. PATENT DOCUMENTS

| | | |
|---|---|---|
| 1,034,981 A | 8/1912 | Crabbs |
| 1,766,096 A | 6/1930 | Benedict |
| 1,866,513 A | 7/1932 | Ballard |
| 2,330,814 A | 10/1943 | Drew |
| 2,418,904 A | 4/1947 | Rugeley et al. |
| 3,444,024 A | 5/1969 | Hillas |
| 3,629,048 A | 12/1971 | Davison |
| 3,925,127 A | 12/1975 | Yoshioka |
| 4,001,472 A | 1/1977 | Thomas et al. |
| 4,107,372 A | 8/1978 | Clausen et al. |
| 4,239,792 A | 12/1980 | Ludwa |
| 4,297,410 A | 10/1981 | Tsuchiya et al. |
| 4,311,479 A | 1/1982 | Fenn et al. |
| 4,348,445 A | 9/1982 | Craig |
| 4,430,137 A | 2/1984 | Jones |
| 4,522,863 A | 6/1985 | Keck et al. |
| 4,609,580 A | 9/1986 | Rockett et al. |
| 4,634,621 A | 1/1987 | Manning et al. |
| 4,661,389 A | 4/1987 | Mudge et al. |
| 4,935,276 A | 6/1990 | Pawlowski et al. |
| 5,022,945 A | 6/1991 | Rhodes et al. |
| 5,042,088 A | 8/1991 | Sherrod et al. |
| 5,141,794 A | 8/1992 | Arroyo et al. |
| 5,306,539 A | 4/1994 | Clarke et al. |
| 5,353,539 A | 10/1994 | Zeh |
| 5,520,945 A | 5/1996 | Coggins |
| 5,607,745 A | 3/1997 | Ogden |
| 5,620,694 A | 4/1997 | Girardot |

(List continued on next page.)

FOREIGN PATENT DOCUMENTS

| | | |
|---|---|---|
| CN | 1275657 | 12/2000 |
| EP | 0 673 856 A | 9/1995 |
| JP | 10 033396 | 2/1998 |
| JP | 10 137140 A | 5/1998 |
| WO | WO 99 32286 A | 7/1999 |
| WO | WO 00 78536 A | 12/2000 |

Primary Examiner—William P. Watkins, III
(74) Attorney, Agent, or Firm—Peter D. Meyer (57) ABSTRACT

A multi-purpose sheet material comprising an absorbent material and a bonding material in contact with the absorbent material. The bonding material and the absorbent material are thermally bonded so that the bonding material and the absorbent material form an amalgamated layer therebetween. A fluid impermeable material is in contact with the absorbent material. The bonding material has a basis weight in the range of 4 g/m² to about 100 g/m² and, the sheet material exhibits a lamination efficiency of at least 10 g/m².

20 Claims, 8 Drawing Sheets

U.S. PATENT DOCUMENTS

| | | |
|---|---|---|
| 5,667,864 A | 9/1997 | Landoll |
| 5,704,886 A | 1/1998 | Sampaolo et al. |
| 5,714,229 A | 2/1998 | Ogden |
| 6,060,149 A | 5/2000 | Nissing et al. |
| 6,071,834 A | 6/2000 | Martz et al. |
| 6,093,663 A | 7/2000 | Ouellette et al. |
| 6,162,155 A | 12/2000 | Gordon et al. |
| 6,203,482 B1 | 3/2001 | Sandford |
| 6,274,232 B1 * | 8/2001 | Otten et al. ............... 428/315.9 |
| 6,383,614 B1 * | 5/2002 | Carson et al. ............... 428/206 |
| 6,391,806 B1 * | 5/2002 | Carson et al. ............... 442/327 |
| 6,451,410 B1 * | 9/2002 | McGuire et al. ............. 428/156 |
| 6,468,646 B2 * | 10/2002 | Carson et al. ........... 428/315.9 |
| 2001/0024715 A1 * | 9/2001 | Otten et al. ............... 428/315.9 |
| 2002/0061386 A1 * | 5/2002 | Carson et al. ............... 428/131 |
| 2002/0061693 A1 * | 5/2002 | Carson et al. ............... 442/327 |
| 2002/0136871 A1 * | 9/2002 | Lockett ...................... 428/198 |

\* cited by examiner

MULTI-PURPOSE ABSORBENT AND CUT-RESISTANT SHEET MATERIALS

FIELD OF THE INVENTION

The present invention relates to cut-resistant and absorbent sheet materials which are suitable for protecting a supporting surface from various articles and/or substances placed thereon and vice-versa. The present invention further relates to such cut-resistant and absorbent sheet materials which are also capable of absorbing and/or containing various liquids which may be carried by or exuded from such various articles and/or substances and protecting the supporting surface from these liquids.

BACKGROUND OF THE INVENTION

Sheet-like materials for use in protecting objects or substances from a supporting surface, and/or protecting supporting surfaces from objects or substances, are well known in the art. Such materials can be utilized to provide a permanent form of protection, but frequently are situation or task-oriented and are only required or utilized for a limited period of time and then disposed of.

One common scenario for the use of such sheet materials is the preparation of food items for consumption, such as the preparing of certain meat products for cooking. Protective sheet materials in this scenario may provide dual protective functions in protecting the food item from soiling and other contamination from a supporting surface, such as a countertop, as well as protecting the supporting surface from soiling due to blood, water, and other fluids and substances present on the surface of the food item. Protective sheet materials may also protect a supporting surface from physical damage such as impact from a sharp object or cutting device such as a knife or cleaver used in such food preparation.

Typically, the consumer is faced with a paradox in selecting an appropriate sheet material for use in such a food preparation scenario. Sheet materials which are comparatively high in absorbency, such as paper-based materials, are typically low in shred-resistance, while those which are comparatively high in cut-resistance, such as plastic sheet materials, are comparatively low in absorbency. Another disadvantage of sheet materials that are comparatively high in absorbency is that they are difficult to sanitize after use to prevent contamination of subsequent food materials that contact the sheet material. This can be due in part to cuts being made in the sheet material that cannot be readily cleaned because of the absorbent nature of the sheet material.

Accordingly, it would be desirable to provide a sheet material which is both comparatively high in absorbency and comparatively high in cut-resistance, yet also comparatively thin, light, and flexible so as to be easily disposed of. It is also desirable to provide such a material which is also high in shred-resistance.

It would further be desirable to provide such a sheet material which, while durable in use, may be so readily and economically manufactured so as to be disposed of after use and replaced with a new and uncontaminated sheet material for a subsequent use. This results in an increase in safety for the end user and can prevent the spread of harmful contamination to uncontaminated foodstuffs.

SUMMARY OF THE INVENTION

The present invention encompasses a multi-purpose sheet material comprising an absorbent material having a top layer and a bottom surface. The top layer comprises an amalgamation of the absorbent material and a continuous sheet of bonding material. A fluid impermeable material is in contact with the bottom surface. The bonding material has a basis weight in the range of 4 g/m$^2$ to about 100 g/m$^2$, and, the sheet material exhibits a lamination efficiency of at least 10 g/m$^2$.

The present invention also encompasses a multi-purpose sheet material comprising an absorbent material having opposing first and second surfaces, an impermeable material in contact with the first surface of the absorbent material, and a bonding material in contact with the second surface of the absorbent material and forming an amalgamated layer therebetween. The sheet material exhibits an absorbent efficiency of at least about 0.2, a lamination efficiency of at least 11 g/m$^2$, and a cut-resistance of at least 30 kgf/cm.

The present invention also encompasses an absorbent, cut-resistant, and shred-resistant article comprising a sheet material. The sheet material exhibits a cut-resistance of at least 30 kgf/cm, an absorbent efficiency of at least 0.2, and a lamination efficiency of at least 10 g/m$^2$.

BRIEF DESCRIPTION OF THE DRAWINGS

While the specification concludes with claims particularly pointing out and distinctly claiming the present invention, it is believed that the present invention will be better understood from the following description in conjunction with the accompanying Figures, in which like reference numerals identify like elements, and wherein:

FIG. 7b is an expanded view of a tear initiation score of the region labelled 7b of FIG. 7a;

DETAILED DESCRIPTION OF PREFERRED EMBODIMENTS

As utilized herein, the term "Absorbent Efficiency" is used to refer to a derived parameter for measuring absorbent properties which has been found useful to characterize sheet materials and determine whether they perform satisfactorily in the food preparation environment. The Absorbent Efficiency takes absorption rate, absorbent capacity, and thickness of the sheet material into account.

In a disposable food preparation sheet, it is desirable to absorb a sufficient quantity of fluid in a reasonable period of time. It is also desirable for the sheet material to be relatively thin to maintain good conformability to a supporting surface and to have an impression of disposability. Thus, the absorbent efficiency can be maximized by maximizing the absorbent capacity, the rate of absorbtion, and minimizing the sheet material thickness.

As utilized herein, the term "Cut-resistance" is used to refer to a derived parameter which has been found useful to characterize sheet materials and determine whether they perform satisfactorily in the food preparation environment. Based on extensive consumer testing, a food preparation mat should have a cut-resistance of at least 30 kgf, as measured using the cut-resistance test discussed below, so that an average consumer will not cut through the protective surface during a single use.

As utilized herein, the term "Lamination Efficiency" is used to refer to a derived parameter which has been found useful to characterize sheet materials and determine whether they perform satisfactorily in the food preparation environment. Lamination Efficiency relates to the integrity of the structure when it is cut during use and measures the effectiveness of incorporation of the bonding material to the absorbent material which could otherwise shred or come loose during typical use. Lamination Efficiency is the amount of mass gained by the bonding material after exerting a force that separates the bonding material from the absorbent material at the adhered interface, at a separation angle of 180°, and a constant rate of separation of 40 inches/minute (102 cm/min). Ultimately, Lamination Efficiency is the comparison of the mass per area of the peeled material versus the mass per area of the raw bonded material and is at least 10 g/m². A sheet material can also have a satisfactory performance if the prepared sample tears during determination of the Lamination Efficiency.

Figure 1:
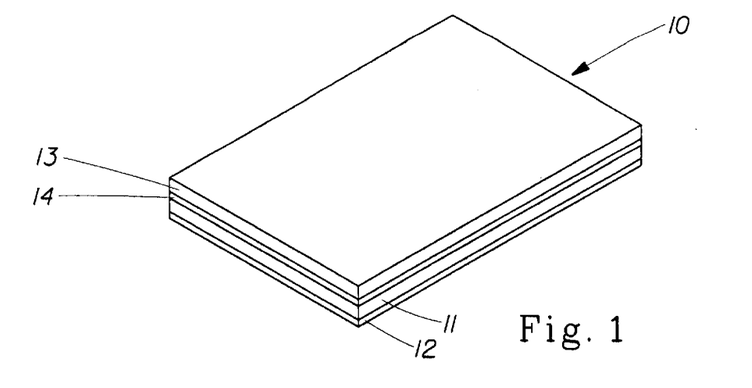
FIG. 1 is a cross sectional view of the cut-resistant and absorbent multi-purpose sheet material in accordance with the present invention.

FIG. 1 depicts one embodiment of a cut-resistant and absorbent multi-purpose sheet material (sheet material) 10 in accordance with the present invention. Sheet material 10 includes an absorbent material 11 which functions as a fluid reservoir, an impermeable material 12, and a bonding material 13 which preferably extends continuously across the surface of absorbent material 11. Sheet material 10 is shown in an orientation suitable for placement upon a supporting surface (not shown), such as a countertop or table, with the impermeable material 12 in contact with the supporting surface and the impermeable material 12 facing outwardly from the supporting surface. Sheet material 10 may also include an optional adhesive system (not shown) on the outwardly-facing surface of the impermeable material 12 which would be placed in contact with a supporting surface.

As shown in FIG. 1, sheet material 10 preferably comprises a generally planar sheet-like structure of the desired planar dimensions and having two opposed principal surfaces which are likewise substantially planar. "Layers" of such a sheet material are also typically substantially planar, coextensive, and/or define planes of contacting surfaces. However, it would be known to one skilled in the art that other geometries could be used. Impermeable material 12 preferably fully covers one surface of absorbent material 11, such that any fluids contained therein cannot pass through the impermeable material 12 and onto any supporting surface upon which the sheet material 10 is placed. Bonding material 13 preferably extends across the surface of the absorbent material 11 opposite from the impermeable material 12, forming a regular repeating pattern of elements.

Since bonding material 13 is preferably thermally heated to facilitate attachment to absorbent material 11, a region, or layer, of amalgamation 14 forms between bonding material 13 and absorbent material 11. In a preferred embodiment, the bonding material 13 is heat bonded to the web fibers of absorbent material 11 so that the heated bonding material 13 forms a discontinuous pattern of adhesion with the individual fibers. This discontinuous bonding of absorbent material web and bonding material will have a discontinuous depth of penetration into the absorbent material 11.

Figure 2:
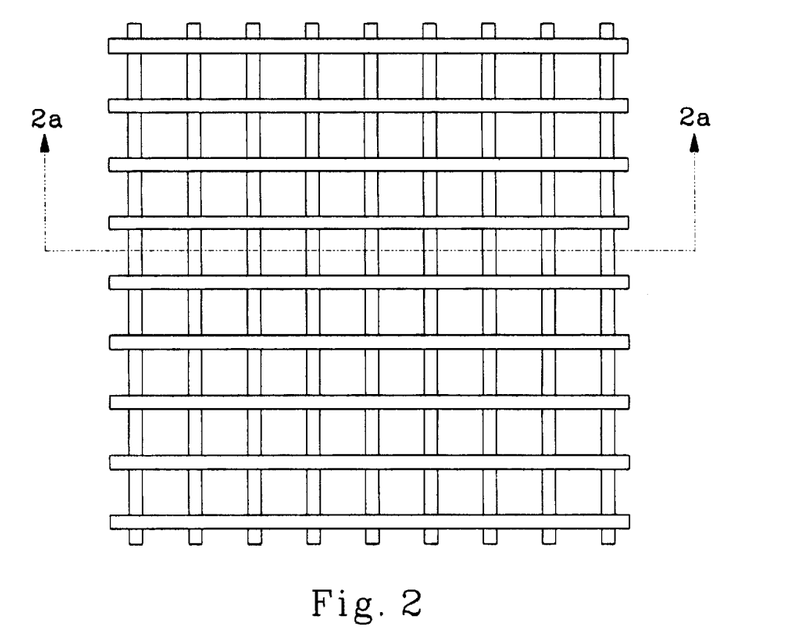
FIG. 2 is a plan view of an exemplary bonding material for use with the present invention.
Figure 2A:
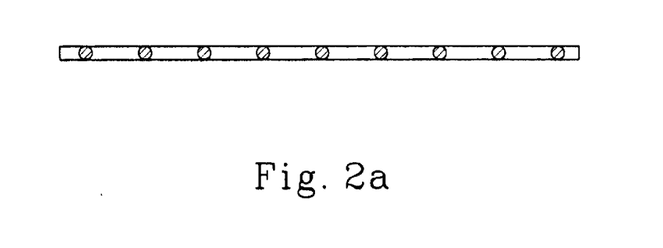
FIG. 2a is a cross sectional view of the bonding material taken along the line 2a—2a of FIG. 2.
Figure 3:
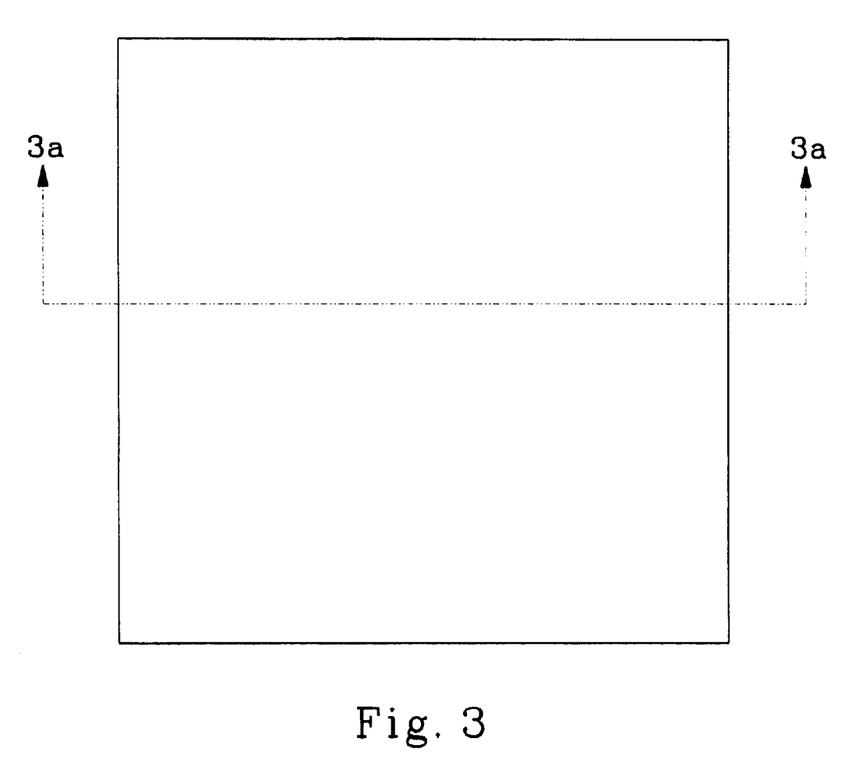
FIG. 3 is a plan view of an exemplary absorbent material for use with the present invention.
Figure 3A:
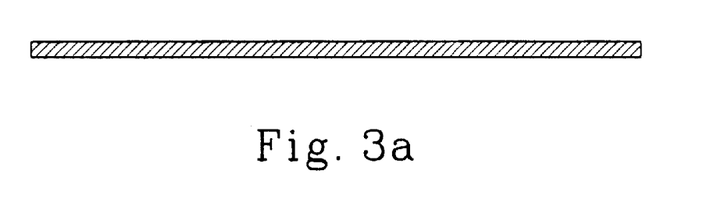
FIG. 3a is a cross sectional view of the bonding material taken along the line 3a—3a of FIG. 3.

As shown in FIG. 1, bonding material 13 (shown as a scrim or woven-like structure and depicted in FIGS. 2 and 2a) is preferably laminated to absorbent material 11 (shown in FIGS. 3 and 3a) by a combination of heat and/or pressure to form amalgamated layer 14. During the amalgamation process, a substantial reduction in the combined thickness of the absorbent and bonding materials 11, 13 occurs. Without wishing to be necessarily bound by theory, it is believed that the bonding material 13 flows both parallel and perpendicular to the large or planar dimensions of the absorbent material 11. This substantial reduction in thickness is representatively shown by comparing the individual thickness of the bonding material and absorbent material (depicted as adjacent layers in FIG. 5) to the corresponding heat and pressure processed structure (shown in FIG. 4a).

Absorbent Material

The absorbent material may be formed from any material or materials suitable for forming an absorbing structure having interstitial regions suitable for absorbing or transporting fluid by capillary action. Additionally, the component fibers or other material may be absorbent. Exemplary suitable materials include materials formed from natural fibers, such as cellulosic fibers or refined cellulosic fibers, and/or synthetic fibers, including hollow fibers and capillary channel fibers. As an alternative to or in combination with such fibers, the absorbent material 11 can include an absorbent polymeric foam material, an absorbent polymeric gelling material, a hydrogel material, and/or natural starches and gums, for example. Materials of particular interest include cellulosic substrates, such as paperboard from SSK (Southern Softwood Kraft), NSK (Northern Softwood Kraft), or hardwood fibers such as eucalyptus cellulosic fiber fluff such as are typically used in paper manufacturing. The absorbent material 11 can alternatively comprise a nonwoven substrate, such as can be constructed by entangling synthetic fibers, for instance. The absorbent material may comprise one monolithic layer of material or may comprise a laminate structure having multiple layers of the same or different composition. In addition, the absorbent material may comprise a carrier web that itself may or may not be absorbent, but may carry an absorbent material. The role of the absorbent material in the sheet materials of the present invention is to absorb and sequester fluids.

Preferably, the web material forming the absorbent material 11 has a relatively high dry basis weight. For example, dry basis weights of in the range of 200 pounds per 3000 ft$^2$ (0.325 kg/m$^2$) to 400 pounds per 3000 ft$^2$ (0.651 kg/m$^2$) are preferred to provide adequate cut-resistance and absorbency. More preferably, the dry basis weight of the absorbent material 11 is in the range of 220 pounds per 3000 ft$^2$ (0.358 kg/m$^2$) to 280 pounds per 3000 ft$^2$ (0.456 kg/m$^2$) and most preferably the dry basis weight of the absorbent material is about 240 pounds per 3000 ft$^2$ (0.391 kg/m$^2$).

If desired for particular applications, the absorbent material 11 or any other elements of the sheet material 10 of the present invention may contain or incorporate certain active materials which act upon the object or substance placed upon the sheet material 10, and/or upon the fluids carried by or exuded from the object or substance. Non-limiting actives may comprise agents intended to neutralize, sequester, disinfect, deodorize, or otherwise modify the properties of solid or liquid materials or the atmospheric environment surrounding the sheet material 10 during use. Particular agents of interest would be those which modify the behavior of fluids such as aqueous fluids, blood-based fluids, oils, etc. Typical properties which may be desirable for certain applications are deodorant properties, antimicrobial properties, coagulating properties, etc. Exemplary materials include baking soda, fibrinogen, and other materials in suitable form for inclusion.

Bonding Material

Preferably, the bonding material 13 may be formed from any material or materials suitable for forming a continuous network or a discontinuous array of discrete elements of the desired size, shape, and spacing. In accordance with the present invention, the bonding material 13 is preferably synthetic. The bonding material 13 may be formed from and/or treated with a material which tends to cause the fluids of interest to "wet out" on the surface, for example, hydrophilic materials. Suitable bonding materials 13 include polymers, polymeric film bonded or laminated to the absorbent material, thermoplastic, or crosslinked resins directly cast, printed, or extruded onto the absorbent material, coated paper or cardboard bonded to the absorbent material 11 by adhesives or the like, etc. The bonding material 13 may comprise one monolithic layer of material, a mixed fiber layer of material, or a laminate structure having multiple layers of the same or diverse composition. Bonding material 13 may have any desired caliper suitable for a particular application.

Preferably, thermoplastic materials utilized for the bonding material 13 have a low enough melting temperature, $T_m$, such that it will soften at temperatures which will not cause the absorbent material 11 to char or burn during the application of heat to effect amalgamation. Such a material can thereby be bonded to the absorbent material 11 through the application of heat and/or pressure.

The bonding material 13 is preferably formed from a material which is durable in use, resilient, and/or scuff/abrasion-resistant. Typical materials which are known in the art as exhibiting such properties may be utilized, including those which typically exhibit a high degree of toughness, interlocked molecular structure of comparatively high molecular weight material, and comparatively high coefficient of sliding friction. Suitable materials include polymeric materials, such as ethylene vinyl acetate (EVA), high density polyethylene (HDPE), low density polyethylene (LDPE), linear low density polyethylene (LLDPE), polyvinyl chloride (PVC), plastisols, polypropylene (PP), polyethylene terepthalate (PET), crystallized PET, polybutylene teraphthalate (PBT), polyethylene naphthalate (PEN), other polyolefins, polyurethanes, paper materials, epoxies, thermosets, inorganic fillers or fibers, mineral fibers, etc. Preferably, the bonding material 13 is selected to have a pre-applied basis weight of from 4 g/m$^2$ to 100 g/m$^2$, and more preferably from 15 g/m$^2$ to 50 g/m$^2$. Additionally, the bonding material 13 is preferably selected to have a post-lamination open area of at least 0.5 percent, more preferably 20 percent, and most preferably 35 percent. The measure of the open area is the measure of the surface area of the absorbent material not in communication with bonding material. The open area maintains communication for the absorbent material to absorb or provide passage of a juice or liquid from the surface of sheet material 10 to the absorbent material 11.

As noted above, the bonding material 13 could also comprise compounded polymeric materials. For example, tough inorganic fillers can also be provided in combination with one or more polymers to form the bonding material 13, in order to reduce the cost of the bonding material 13 and/or change particle toughness, density, cut-resistance, color, or other property. Suitable fillers include $CaCO_3$, talc, and mica, for example. However, although particulates and fillers can be used to form bonding material 13, it is preferred that absorbent material 11 is substantially free of inorganic free filler particulate. As used herein, the term "free filler particulate" refers to inorganic particles which are not bonded to the absorbent material 11 and which merely reside freely within the absorbent material 1. Such a material may be released from the sheet material 10 during cutting operations and be mixed with the food items being prepared, potentially making the food undesirable in appearance and/or unsuitable for consumption. It is also preferable that the absorbent material 11 is substantially free of organic free filler particulate which is not suitable for contact with food items. Organic free filler particulate does not refer to the absorbent material 11, such as cellulosic fibers and the like as described herein. By "substantially free" what is meant is an amount no greater than that which would be safe for use of the absorbent material 11 in food preparation, or less than an amount in which the filler particulate released during food preparation is noticeable by visual or tactile inspection of the absorbent material 11 or food items, or both. By tactile inspection, what is meant is tactile sensory via the hand, or, with respect to food items, the mouth. Preferably, 0% of such free filler particulate is added to the absorbent material 11. If free filler particulate is included, however, the level should preferably be no greater than about 10%, more preferably no greater than about 5%, more preferably no greater than about 2%, more preferably no greater than about 1%, more preferably no greater than about 0.5%, and most preferably no greater than about 0.1% by weight of the dry sheet. Notwithstanding the above, the sheet material 10 hereof can be substantially free of free filler particulate if it contains unbonded particulate material, but none of the particulate material is releasable when the sheet material 10 is used as intended (i.e., by placing a food item on the side of the sheet intended to be used for cutting, and cutting the food item while it is on this side of the sheet.) Thus, the sheet material 10 can be substantially free of filler particulate when it includes unbonded particulate material which is positioned or configured such that little or none is released from the cutting surface during cutting.

Figure 4:
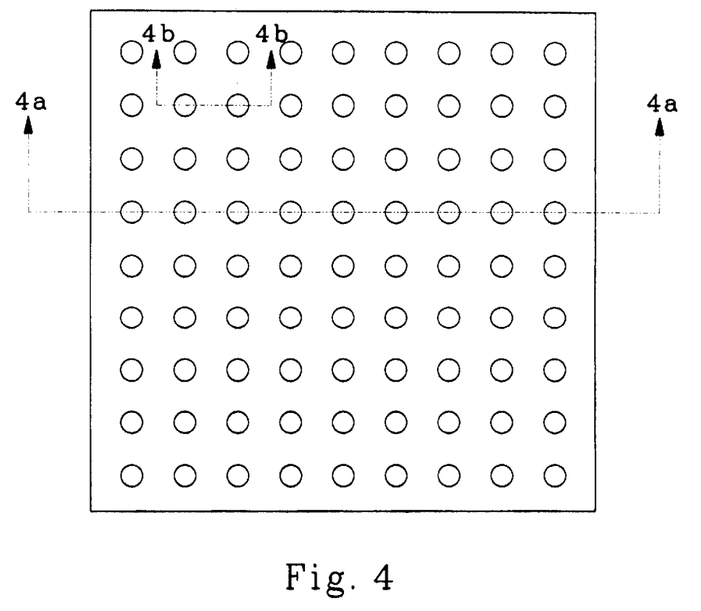
FIG. 4 is a plan view of an exemplary combination of a bonded and combined bonding material and absorbent material of the present invention.
Figure 4A:
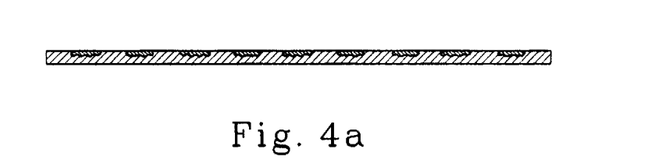
FIG. 4a is a cross sectional view of a bonded and combined bonding material and absorbent material taken along the line 4a—4a of FIG. 4.
Figure 4B:
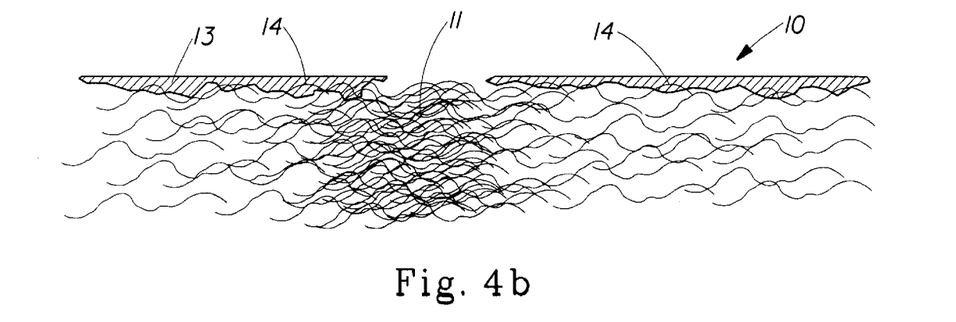
FIG. 4b is a magnified view of the combination of a bonded and combined bonding material and absorbent material in area 4b of FIG. 4.
Figure 5:
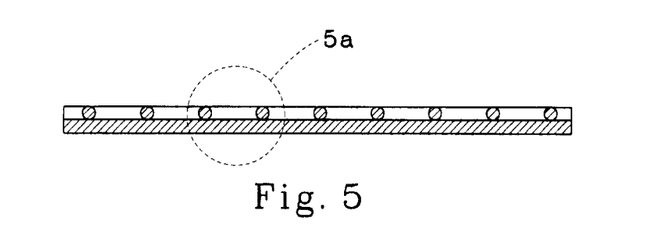
FIG. 5 is a cross sectional view of an unbonded and combined bonding material and absorbent material.
Figure 5A:
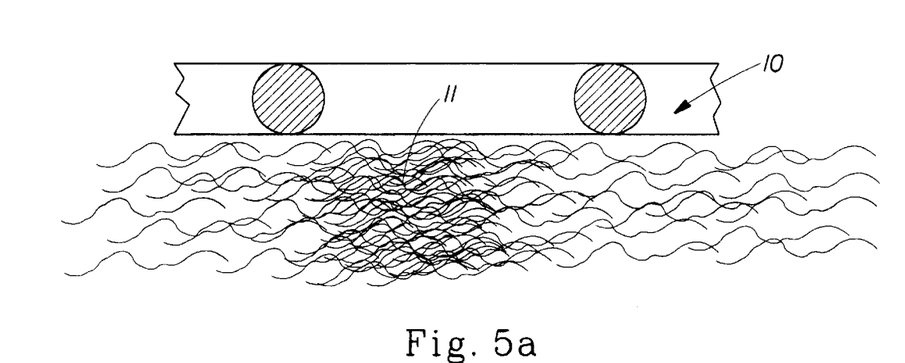
FIG. 5a is an magnified view of an unbonded and combined bonding material and absorbent material in area 5a of FIG. 5.

Without wishing to be bound by theory, for the majority of bonding materials, there is a substantial flow of the bonding material 13 parallel to the absorbent material 11 as shown in FIG. 4a. Additionally, there is a flow or penetration of the bonding material 13 into the absorbent material 11 perpendicular to the large dimensions of the absorbent material 11. The resulting penetration of the bonding material 13 into the absorbent material 11 is somewhat non-uniform corresponding to the non-uniformity of the absorbent material 11. For example, wet laid paper manufacture using a Fourdrinier paper machine are known to be capable of producing a very smooth and uniform paper. However, fiber density is not uniform across very small dimensions approaching the individual fiber diameter. While surface roughness and non-uniformity are preferably reduced as higher levels of paper smoothness are obtained, often through calendaring, variations in fiber density routinely result in more dense and less dense regions of the final paper or absorbent material. As a consequence of non-uniform regions of paper density, the combination of heat and pressure applied during a laminating process can cause the flow of bonding material 13 to be non-uniform over regions of the bonding material 13 and absorbent material 11 interface of dimensions approaching the individual fiber dimensions of the absorbent material 11 fiber. FIG. 5a shows a cross-sectional view of the bonding material 13 adjacent and non-laminated to the absorbent material 11. FIG. 5a shows variation in the density of the absorbent material 11 as shown by number of fibers. FIG. 4b shows an exemplary non-uniform interface existing between the bonding material 13 and the absorbent material 11 after an efficient lamination.

As shown in FIG. 4b, the non-uniform interface between the bonding material 13 and absorbent material 11 is comprised of an amalgam of both the bonding material 13 and absorbent material 11 formed as the bonding material 13 flows perpendicular and into the thickness or small dimension of the absorbent material 11. Bonding material 13 consequently flows between fibers and especially into the lower density regions within the localized non-uniform lower density regions of the absorbent material 11. This amalgamated layer 14 integrates a portion of the paper fibers into the bonding material 13 resulting in an effective lamination which achieves a peel strength substantially equal to that of the internal strength of the absorbent material 11. An effective lamination is characterized by the absorbent material 11 being bonded to the bonding material 13 so that the absorbent material 11 is integrated into the bonding material 13. When well integrated, the bonding material 13 cannot be delaminated or peeled from the aborbent material 11 without either substantial mass loss from the absorbent material 11 or incomplete peeling as the combined bonding and absorbent materials break without substantial peeling. This incomplete peeling, resulting in tearing or breaking, occurs when the bonding material 13 is well integrated with the absorbent material 11 and has a tear strength equal to or less than the internal strength of the paper. This characterization is expressed by a satisfactory Lamination Efficiency and is determined by the test method discussed infra.

Impermeable Material

The impermeable material 12 is generally used as a backing sheet and may preferably be formed from any material or materials suitable for forming a continuous layer or coating on a surface of the absorbent material 11 which is impervious to fluids of interest. Suitable materials include polymeric films bonded, amalgamated, or laminated to the absorbent material 11, thermoplastic resins directly cast, extruded, or thermoformed onto the absorbent material, metallic foils, or other impervious coatings printed, coated, hot-pressed, sprayed, adhered, or otherwise topically applied. The impermeable material 12 can also be applied during manufacture of the absorbent material 11. The impermeable material 12 may comprise one monolithic layer of material or may comprise a laminate structure having multiple layers of the same or diverse composition. Impermeable material 12 preferably has a high coefficient of friction to facilitate immobility to a support surface and is preferably coextensive with absorbent material 11 to prevent the release of absorbed fluids from the absorbent material 11 to a support surface.

An optional, or additional, adhesive system may comprise a zonal, patterned, discrete, or continuous coating or layer of a pressure sensitive adhesive or any other adhesive system known in the art to provide for an adhesive force between the sheet material 10 and a supporting surface. This optional feature provides additional lateral stability over and above the friction between the impermeable material and the supporting surface. Release liners or other configurations may be desired depending upon the tack of the adhesive and/or the construction of the sheet material. Other configurations may utilize a non-adherent but comparatively high coefficient of friction material which resists sliding upon most typical supporting surfaces.

Sheet Material

In use, the sheet material 10 is placed upon a supporting surface such as a countertop, tabletop, or floor surface and an object or substance is placed thereon. The object or substance may be a food item or any other item of interest which is to be manipulated or otherwise handled or treated during the course of any operation. The sheet material 10 could also be utilized for storage of an object to collect residual fluids such as in the case of thawing frozen foods. After use or when the absorbent material 11 has become sufficiently contaminated or saturated with fluids, the sheet material may be disposed of in a responsible manner.

Preferably, sheet material 10 has a thickness t ranging from 250 $\mu$m (0.01 inch) to 1270 $\mu$m (0.05 inch) to provide adequate cut-resistance and absorbency. If paper making processes and machinery are used to produce the sheet 10, manufacturing parameters such as material application rate, amount and duration of pressure applied, etc. can be adjusted to manipulate the basis weight and thickness of the resulting sheet 10.

The sheet material 10 is preferably sufficiently flexible and conformable such that it will conform to somewhat irregular or profiled supporting surfaces. For certain dispensing or packaging configurations, it may also be desirable for the sheet material 10 to be sufficiently conformable in one or more directions such that it may be rolled upon itself to form a more compact configuration. Selection of materials for respective elements of the sheet material 10, as well as maintaining a comparatively low bending modulus via appropriate structural design (small cross-section, minimal thickness normal to the plane of the sheet material, discontinuous pattern, etc.), aids in obtaining the desired degree of flexibility.

Additional absorbent capacity and protection of underlying and surrounding surfaces may also be provided in the form of a highly absorbent border at the periphery of the sheet material 10, a lip around the marginal edge, or other suitable techniques.

It may be desirable for certain applications to include a color-changing feature to the sheet material 10 to indicate a change in condition of the sheet occurring during use. For example, it may be desirable to include a color-changing composition in the sheet material 10 whereby the absorbent material 11 changes color when it absorbs fluid. Additionally, colors of respective sheet elements may be selected such that the bonding material 13 and absorbent material 11 are initially the same color, such as white, until the absorbent material 11 changes to a contrasting color, such as red. One method of accomplishing such a color change is to incorporate a food grade additive or other pigmented powder, either within or underneath the absorbent material 11. When the pigmented powder is exposed to fluid it dissolves in the fluid and "bleeds" into the absorbent material 11 and changes the apparent color of the absorbent material 11. Color change may be triggered by the occurrence of other physical changes in functionality, such as depletion of an anti-microbial agent, or presence of bacteria, within the absorbent material. One method believed suitable for such an execution is disclosed in U.S. Pat. No. 4,311,479, issued Jan. 19, 1982 to Fenn et al., the disclosure of which is hereby incorporated herein by reference.

Although for some applications a compartmentalized absorbent material 11 distribution may be desirable, it is presently preferred for most applications to utilize a continuous absorbent material 11 so as to provide for the maximum level of absorbency.

Sheet materials 10 in accordance with the present invention may be deployed in a wide variety of scenarios and utilized for a wide variety of functions. Representative products made from sheet materials 10 include, but are not limited to, place mats, food preparation mats, mats for draining washed or cooked food, floor mats, drawer and shelf liners, etc. Objects of interest may include food items such as cuts of meat, produce, baked goods, produce such as fruits and vegetables, etc.

In accordance with the present invention, sheet materials 10 such as those depicted in the foregoing discussion of drawing figures exhibit comparatively high levels of absorbency, shred-resistance, and cut-resistance, more particularly, lamination efficiency and absorbent efficiency.

Scoring

Figure 7:
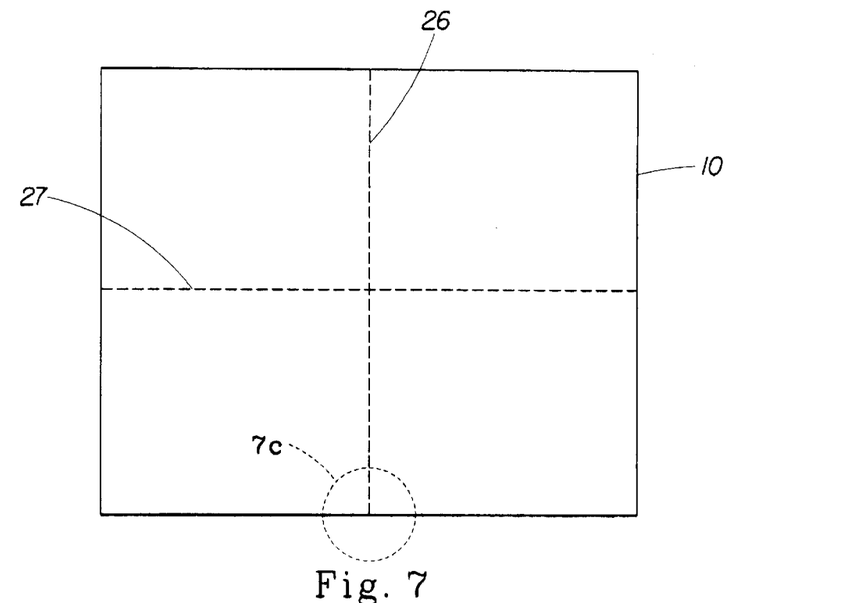
FIG. 7 is a plan view of an exemplary sheet material having score marks.
Figure 7A:
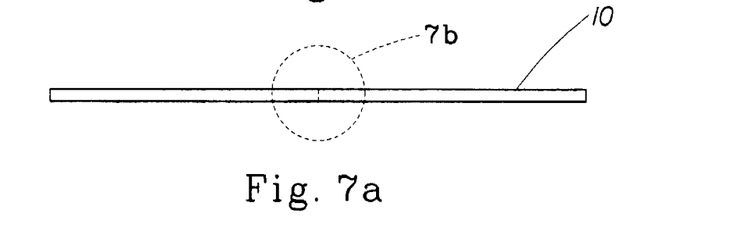
FIG. 7a is a cross sectional view of a tear initiation score taken along the line 7a—7a of FIG. 7.
Figure 8:
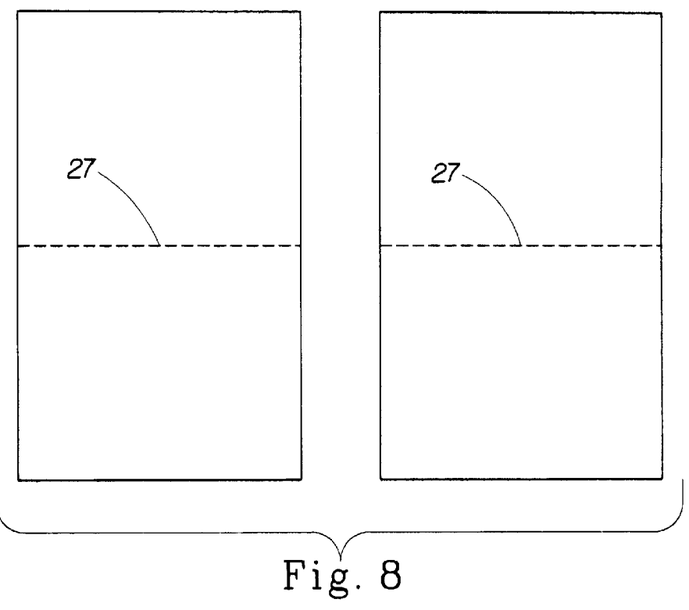
FIG. 8 is a plan view of the exemplary separated sheet material of FIG. 7.
Figure 9:
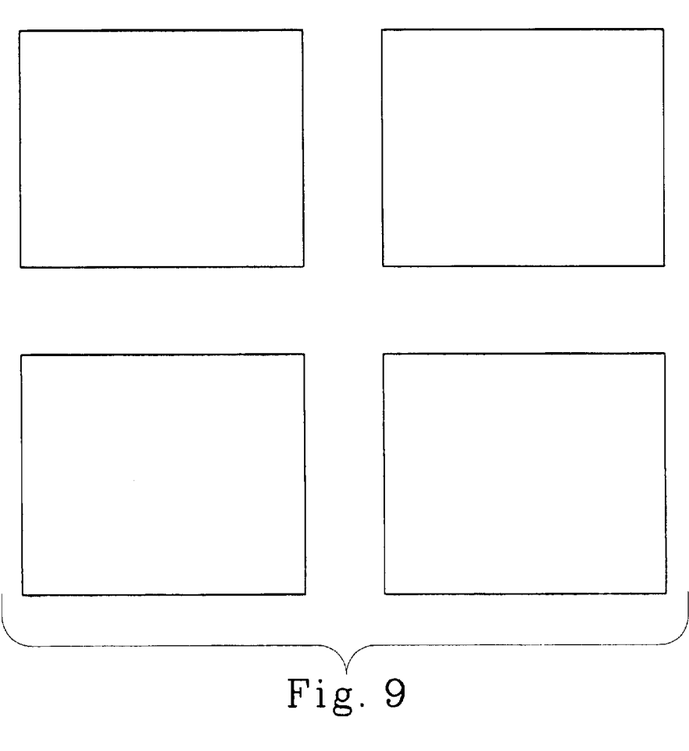
FIG. 9 is a plan view of another exemplary separated sheet material of FIG. 7.

As shown in FIG. 7, at least one series of weaknesses, weakened zones, or lines of weakness 26, 27, such as score lines, lines of perforation, or intermittent scores, can be employed on sheet material 10 if desired to add additional flexibility and/or to promote folding or bending of sheet material 10 in certain directions or regions. These weaknesses 26, 27 can be incorporated in the sheet material 10 to facilitate separation of the sheet material 10 into distinct pieces amenable for use with smaller items. As shown in FIGS. 8 and 9, the sheet material 10 can therefore, be scored to affect a separation into two or more fragments. Likewise, as would be known to one of skill in the art, many other patterns can be scored to effect decorative separations of sheet material 10. This advantage provides a single sheet for use with multiple items without risking contamination of the remainder of a single sheet.

Figure 10:
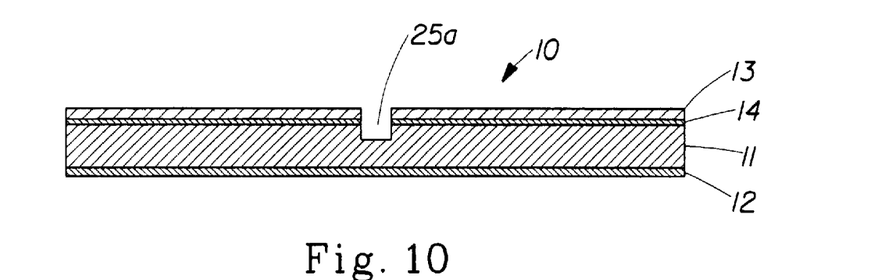
FIG. 10 is a cross-sectional view of an exemplary sheet material showing an exemplary score.
Figure 11:
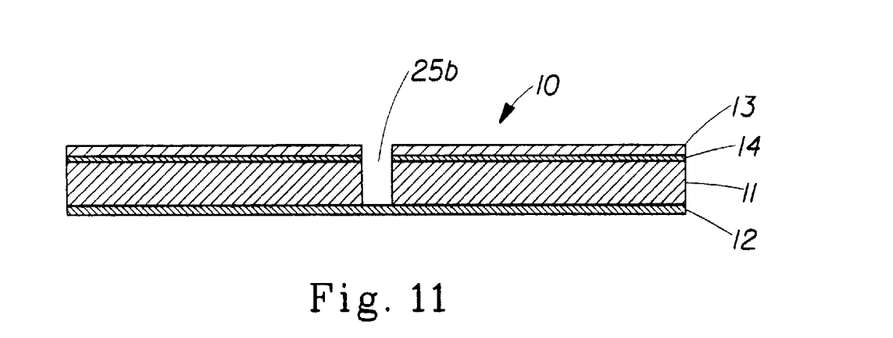
FIG. 11 is a cross-sectional view of another exemplary sheet material showing an exemplary score; and, FIG. 12 is a cross-sectional view of another exemplary sheet material showing an exemplary score.
Figure 12:
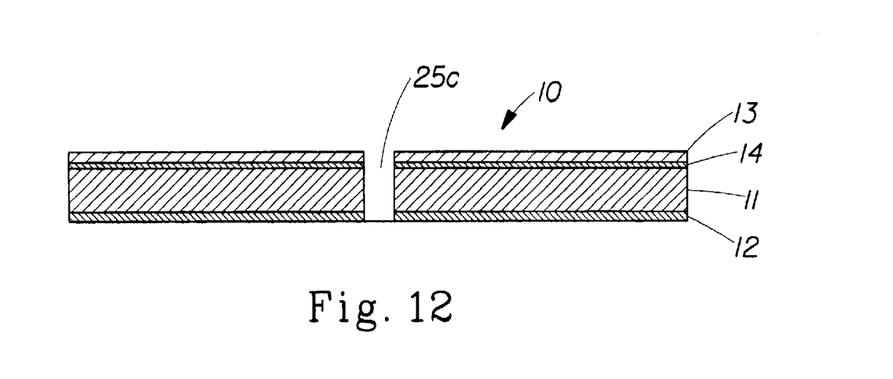

Intermittent scoring can be accomplished by substantially reducing the integrity of the absorbent and bonding materials, thus facilitating separation of a sheet section by the user applying a tearing action. Additionally, as shown in FIGS. 10–12, intermittent score 25a, 25b, 25c are preferably spaced so that the cut-resistance of the bonding material 13, amalgamated layer 14, absorbent material 11, and impermeable material 12 is substantially preserved. However, as would be known to one of skill in the art, the score depth and spacing of scores 25a, 25b, 25c can be adjusted to provide ease of sheet separation and maintain cut-resistance. Additionally, the score depth can be controlled so that the bonding and absorbent materials may be partially cut through their thickness 25a, or entirely through their thickness 25b, 25c, so that the impermeable material 12 is either entirely 25a, 25b or partially 25c in tact.

A consideration in determining individual score length is the geometry of cutting implements which may come in contact with the sheet, for example, serrated knives. The size of the individual scores can be adjusted so that the protrusions forming the serrated shape of such a knife will not easily fit within the length and width of the score.

Thus, it is preferred that a sheet material have one or more intermittent scores with an individual score length of between 0.01 inches (0.25 mm) and 0.5 inches (12.7 mm), more preferably between 0.02 inches (0.50 mm) and 0.1 inches (2.54 mm), and most preferably between 0.03 inches (0.76 mm) and 0.05 inches (0.13 mm). It is also preferred that the scores have a repeated space between score lines of between 0.01 inches (0.25 mm) and 0.5 inches (12.7 mm), more preferably between 0.02 inches (0.50 mm) and 0.1 inches (2.54 mm), and most preferably between 0.03 inches (0.76 mm) and 0.05 inches (1.27 mm).

It is also preferred that the scores have a depth of scoring partially through the bonding and absorbent materials 13, 11 or entirely through the bonding and absorbent materials 13, 11 and up to or partially through the impermeable material 12. Thus, a score would extend from one side of the sheet material 10 through the sheet material thickness leaving an unscored thickness longitudinal to the score of between 0.0001 inches (0.0025 mm) and 0.025 inches (0.64 mm), more preferably between 0.0075 inches (0.19 mm) and 0.0125 inches (0.32 mm), and most preferably between 0.001 inches (0.025 mm) and 0.03 inches (0.76 mm) for a sheet material 10 having a thickness ranging from 0.01 inch (250 μm) to 0.05 inch (1270 μm).

Figure 7B:
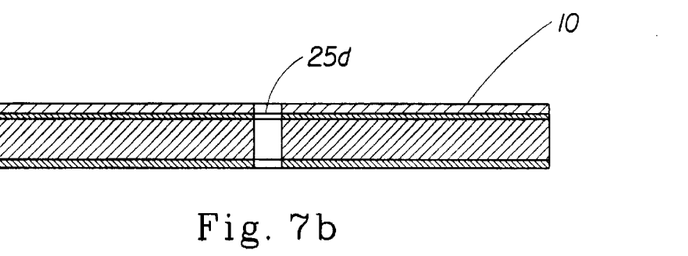

As shown in FIG. 7b, in order to initiate tearing of the sheet material 10 into separate sections, it is generally desirable to include a tear initiation score 25d which extends through the impermeable material 12 at the edge of the sheet material 10. Without wishing to be bound by theory, it is believed that tear initiation score 25d assists in the propagation of a tear in the impermeable material 12. This reduces the force required to initiate a tear, the potential for non-tear deformation, and the potential for separation of the impermeable material 12 from the absorbent material 11 when it is desired to separate the sheet material 10 into different sections.

Figure 7C:
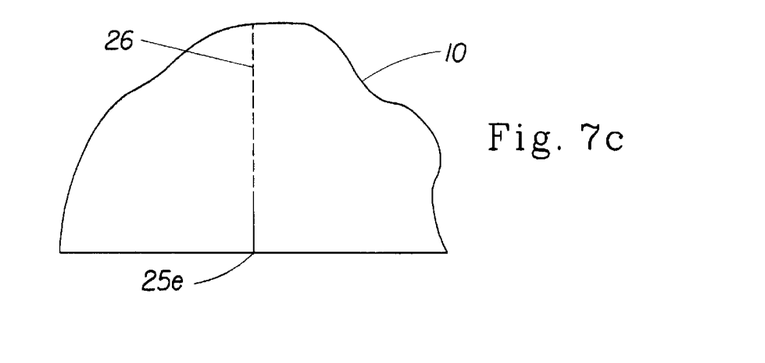
FIG. 7c is an expanded view of a tear initiation score of the region labelled 7c of FIG. 7.

As shown in FIG. 7c, tear initiation score 25d can vary in length from the edge 25e of the sheet material 10 according to the specific use intended so that it does not substantially interfere with the impermeable benefits of the sheet material 10. It is preferred that tear initiation score 25d have a length between 0.005 inches (0.127 mm) and 1.0 inches (25.4 mm), more preferably between 0.05 inches (1.27 mm) and 0.5 inches (12.7 mm), and most preferably between 0.1 inches (2.54 mm) and 0.375 inches (9.53 mm).

Manufacture

Figure 6:
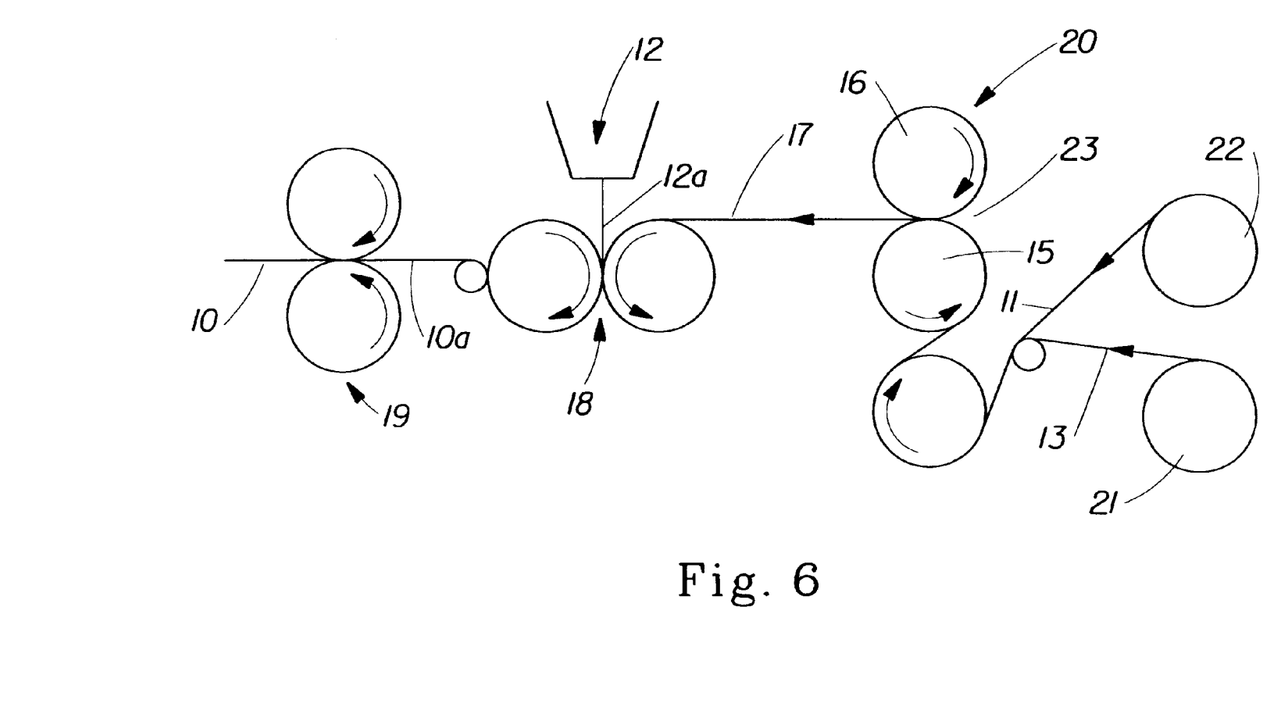
FIG. 6 is a plan view of an exemplary process for manufacturing the cut-resistant and absorbent sheet material of FIG. 1.

FIG. 6 illustrates a suitable process and equipment for producing the sheet material 10 according to the present invention. Continuous webs of the absorbent material 11 and the bonding material 13 are fed from a spool or roll 22, 21 respectively. The two continuous webs or sheets 11, 13 are fed together through the hot press 20 to bond or laminate absorbent material 11 with bonding material 13 at laminating station 23. At laminating station 23, melted bonding material 13, due to the resulting pressure from middle roll 15 and top roll 16 laminates the bonding material 13 into the top surface of the absorbent material 11. This applied heat and pressure causes bonding material 13 to flow into absorbent material 11 to form amalgamated layer 14. Likewise, a heated band press, or other heated press apparatus as would be known to one of skill in the art, could also be utilized for the lamination process.

Preferably, the individual webs are heated as they pass over the heated middle roll 15 of the laminating station 23. Heating middle roll 15 may allow the process to run at higher speeds. Without wishing to be bound by theory, it is believed that the polymeric nature of thermoplastic bonding material 13 causes bonding material 13 to shrink in size upon the application of heat. Therefore, the frictional forces present on the surface of absorbent material 11 constrain movement of bonding material 13 caused by the heating of bonding material 13 and any subsequent polymeric matrix degradation and shrinkage. Thus, individual webs 11, 13 are preferably wrapped around the middle roll 15 so that the bonding material 13 is in direct contact with the heated middle roll 15. Additionally, middle roll 15 is preferably treated with a release coating to prevent the bonding material 13 from sticking to middle roll 15 as it melts.

An impervious material 12 is then preferably applied to the sheet 17. This can preferably be accomplished by application of a coating to the sheet 17 by extrusion coating station 18 as would be known to one skilled in the art. The extrusion coating station 18 coats the unlaminated surface of the sheet 17 with a film of molten polymer 12a. The molten polymer film 12a bonds with the sheet 17 creating the sheet material 10a.

The web sheet material 10a is next preferably routed to a die-cutting station 19. The die-cutting station 19 preferably utilizes a rotary die-cutting tool to cut the web sheet material 10a into individual sheets 10 or provide a scoring line or lines to sheet material 10. Exemplary absorbent materials, bonding materials, line speeds, process temperatures and pressures for producing exemplary sheets in accordance with the present invention are detailed in Table 1.

TABLE 1

Exemplary Process Materials, Line Speeds, Temperatures and Pressures

| Absorbent Material | Bonding Material | Line Speed (m/min) | Middle Roll Surface Temp(° C.) | Bottom Roll Surface Temp(° C.) | Nip Force (N/m) |
|---|---|---|---|---|---|
| 100% NSK, 0.559 mm thick, 0.406 kg/m² Paperboard | 15 g/m² 9 denier, polypropylene carded nonwoven | 60.96 | 209 | 98 | 18388 |
| 100% NSK, 0.559 mm Thick, 0.406 kg/m² Paperboard | 48.9 g/m² polypropylene scrim | 12.19 | 213 | 114 | 23817 |
| 100% NSK, 0.559 mm Thick, 0.406 kg/m² Paperboard | 34.2 g/m² polypropylene scrim | 24.38 | 211 | 141 | 23817 |

Test Methods

The following test methods have been developed and utilized for characterizing the sheet materials in accordance with the present invention.

Absorbent Rate:
1) A 4 in. by 4 in. (10.16 cm by 10.16 cm), 16 in² (103.2 cm²), sample of sheet material is preconditioned in a controlled temperature environment of 140° F. (60° C.) and 0% relative humidity for 24 hours. The sheet material sample is then conditioned in controlled temperature and humidity environment of 73° F. (22.78° C.) and 50% relative humidity for 24 hours.
2) Weigh and record the initial weight of each conditioned sample.
3) Measure and record the sheet thickness of each conditioned sample.
4) Calculate and record the average sheet thickness of the conditioned samples.
5) Place the weighed and conditioned sample on a clean, flat testing surface directly under and 2 inches (5.08 cm) from a Buret containing 5 cc of distilled water so that the water will be dispensed onto the large dimension of the sample.
6) Dispense the distilled water from the Buret onto the conditioned sample.
7) Let the sample absorb all or a portion of the water for 30 seconds. If all water is absorbed prior to 30 seconds, record this time of absorption.
8) At 30 seconds the sample is held on an edge perpendicular to the clean flat testing surface, and gently tapped by raising it perpendicularly 1 in (2.54 cm) above the testing surface and back down to the testing surface. This is repeated 10 times at 1 second intervals to remove any visible, non-absorbed water remaining on the sample surface.
9) Weigh the sample and record the sample final weight.
10) The Absorbent Rate is calculated as (final weight−initial weight)/time (the observed absorption time or 30 seconds, whichever is shorter). The derived units of Absorbent Rate are $$\frac{g_{water}}{s}.$$

11) Calculate the unit absorbency rate as ((final weight−initial weight)/time)/sample area. The units are $$\frac{g_{water}}{s \cdot cm^2}.$$

12) Repeat this test on 2 new samples of sheet material, prepared as above.
13) Record the average of sample values and report as "Absorbent Rate".

Absorbent Capacity:
1) A 4 in. by 4 in. (10.16 cm by 10.16 cm), 16 in² (103.2 cm²), sample of sheet material is preconditioned in a controlled temperature environment of 140° F. (60° C.) and 0% relative humidity for 24 hours. The sheet material sample is then conditioned in controlled temperature and humidity environment of 73° F. (22.78° C.) and 50% relative humidity for 24 hours.
2) Weigh and record the initial weight of each conditioned sample.
3) Measure and record the sheet thickness of each conditioned sample.
4) Calculate and record the average sheet thickness of the conditioned samples.
5) Completely submerge the pre-weighed and conditioned sample in a 5 gallon (18.93 l) container containing at least 1 gallon (3.785 l) of distilled water for 120 sec.
6) Remove the sample from the container by holding a corner.

7) Hold the sample perpendicular to the container for 30 seconds to remove any unabsorbed water.
8) Weigh the sample and record the final weight.
9) Calculate the Absorbent Capacity as (final weight−initial weight)/sample area. The units are $$\frac{g_{water}}{cm^2}$$

10) Repeat this test on 2 new samples of sheet material, prepared as above.
11) Calculate the average absorbent capacity values and report as "Absorbent Capacity".

Absorbent Efficiency:
1) Calculate the Absorbent Efficiency as:

$$AbsorbentEfficiency = \frac{AbsorbentCapacity \cdot AbsorbentRate}{sheetthickness} * 10^4$$

where Absorbent Capacity has units of $$\frac{g_{water}}{cm^2},$$

Absorbent Rate has units of $$\frac{g_{water}}{s \cdot cm^2},$$

sheet thickness has units of cm, and the Absorbent Efficiency has units of $$\left(\frac{g_{water}}{cm^2}\right)\left(\frac{g_{water}}{s \cdot cm^2}\right)\left(\frac{1}{cm}\right).$$

Cut-Resistance

The test apparatus described applies a known force in the z (vertical) direction on a knife blade to measure the cut-resistance of a sample when a force is directly applied.
12) A 6 in. by 8 in. (15.24 cm by 20.32 cm), 48 in$^2$ (309.7 cm$^2$), sample of sheet material is preconditioned in a controlled temperature environment of 140° F. (60° C.) and 0% relative humidity for 24 hours. The sheet material sample is then conditioned in a controlled temperature and humidity environment of 73° F. (22.78° C.) and 50% relative humidity for 24 hours.
1) Measure and record the sheet material thickness of each conditioned sample.
2) A Personna Poultry Blade, Code # 88-0337, or equivalent, is placed in the knife holder of the cut-test apparatus.
3) The conditioned test sample is affixed to the sample platform of the cut-test apparatus.
4) The knife blade is then brought into contact with the affixed sample.
5) A known load is applied to the center edge of the knife blade.
6) The sample platform is moved at a rate of 8 in/sec (0.203 m/sec) for 4 inches (10.16 cm) under the weight of the knife blade. This is defined as a slice.
7) Remove the sample from the sample platform to visually inspect the slice for a "cut through." A cut through is defined as a slice that has penetrated completely through the sample sheet any length within the 4 in (10.16 cm) distance. A cut through is visually detectable by carefully observing the front and back of the sample sheet in a well-lighted area.
8) Record observations. If there is a cut through, then decrease the force by a maximum of 0.5 lbs (226.8 gm force). If there is not a cut through then increase the force by a maximum of 0.5 lbs (226.8 gm force).
9) Remount the sample sheet on the sample platform.
10) Adjust the sample platform to assure a cut in a different region of the sample sheet.
11) Record the mininum knife force required to penetrate completely through the sample as the "Cut Through Force" (kg).
12) Repeat consecutive series of cuts until a minimum Cut Through Force is noted and report the average value for three distinct samples.
13) "Cut-resistance" is calculated as the Cut Through Force divided by the average Sheet Thickness (cm).

Cut-Resistance=Cut Through Force (*kg*)/Sheet Thickness (*cm*)

Lamination Efficiency

Lamination Efficiency evaluates the lamination of the bonding material, having a known basis weight (BW), to the absorbent material.

Lamination Efficiency Sample Preparation:
1) Three 8 in by 1 in (20.32 cm by 2.54 cm), 8 in$^2$ (51.61 cm$^2$), specimens of sheet material are preconditioned in a controlled temperature environment of 140° F. (60° C.) and 0% relative humidity for 24 hours. The sheet material sample is then conditioned in controlled temperature and humidity environment of 73° F. (22.78° C.) and 50% relative humidity for 24 hours.
2) Measure and mark the center line width (0.50 in (1.27 cm)) of each specimen.
3) Measure along the centerline 1 inch (2.54 cm) from a 1 inch (2.54 cm) edge and mark a cross-width line.
4) Using a sharp cutting blade suitable for cutting through the sample material, cut a line from the measured and marked center of the sample edge to the marked and measured 1 in (2.54 cm) line.
5) Repeat for the other side of the specimen on the same end of the sample.
6) The material remaining with the specimen after both cuts should now form a "V" by subtending an angle of 30° on either side of the measured longitudinal center line.
7) Apply 0.00496 lbs (2.25 grams) of an adhesive containing acetone and a petroleum distillate, for example, Dyna Systems Quick-Flex general purpose adhesive, product number 672-02-500, evenly across the entire non-laminated side of each specimen.
8) Align and adhere the remaining squared end of the adhesively treated specimen, with the edge of a 10 in by 1 in by 0.125 in (25.4 cm by 2.54 cm by 0.3175 cm) stainless steel metal plate.

Pressure Sensitive Adhesive Tape Preparation:
1) Provide a 39 in by 2 in (99.06 cm by 5.08 cm) pressure sensitive adhesive tape having a Tappi T 540 om-93 Peel Force of a minimum of 6.86 lbs. (3112 g) when adhered to a stainless steel plate, for example, SpectTape®, Inc. ST260 Silver Cloth Duct Tape pressure sensitive tape. The minimum peel force of the tape required may vary according to the surface properties and geometry of the top layer or bonding material of the sheet material. The purpose of having a high peel force tape is to ensure sufficient adhesion to the sheet material to fully delaminate the material in the area of contact. If the tape does not adhere sufficiently in the contact area to cause delamination the test is not valid and a tape having a higher peel force will be necessary.
2) Fold the tape upon itself with the adhesive side inward, leaving 1 lineal inch (2.54 cm) of adhesive exposed.

3) Adhere the exposed 1 in (2.54 cm) of pressure sensitive adhesive tape to the "V" cut edge of the specimen.
4) Place a 20 lb (9.0 kg) mass on the pressure sensitive adhesive tape adhered to the "V" cut edge of the specimen for 60 sec.

Test Procedure:
1) Insert the un-adhered 2 in (5.08 cm) portion of the metal plate holding the specimen into the stationary clamp of a tensile strength test machine, such as an Instron® (model 550R/1122), or equivalent.
2) Insert the folded over portion of the pressure sensitive adhesive tape into the other (Z direction) clamp of the tensile strength test machine.
3) Move the upper clamp away from the stationary clamp at 180° and 0.667 ft/sec (0.2032 m/sec) to peel the bonding material and the amalgamated layer from the absorbent material.
4) Record observations such as breakage of the bonding material where any of the bonding material, amalgamated layer, or the absorbent material did not maintain the original 1 in by 8 in (2.54 cm by 20.32 cm) starting dimension. As discussed in the tape sample preparation section of this method, in the event the tape does not delaminate the sheet material in the area of contact the test is not valid and a more strongly adhering tape must be used.
5) After testing, retrieve the used pressure sensitive tape for observations.
6) In the event there is incomplete peeling denoted by less than the entire sample area being delaminated, then the sample passes the lamination efficiency test and the bonding layer is considered well integrated with the absorbent layer. Record the result as "pass". A "pass" is considered to meet the minimum requirement of a sample of sheet material having a Lamination Efficiency of at least 10 g/m$^2$.
7) If the sample peels away and delaminates over the entire sample area, then cut the peeled away bonding material, amalgamated layer, and absorbent material from the used pressure-sensitive tape.
8) Measure and record the area (m$^2$) of the bonding material, amalgamated layer, or absorbent material that was peeled away by the pressure sensitive tape during the test. This is called Area$_{(peeled)}$.
9) Measure and record the mass (g) of the bonded material, amalgamated layer, or absorbent material that was peeled away by the pressure sensitive tape during the test. This is called Mass$_{(peeled)}$.
10) Calculate the lamination efficiency of the specimen by:

$$\text{Lamination Efficiency} = \frac{Mass_{(peeled)}}{Area_{(peeled)}} - BW$$

11) The units of Lamination Efficiency are g/cm$^2$.

EXAMPLES

The following numbered Examples describe materials, which were made and tested in accordance with the test protocol herein to generate the data are tabulated in Table 1.

Examples 1–9 will be resistant to cutting, and therefore fragments are less easily freed from these materials during cutting operations, and less likely to contaminate food items being prepared. In particular, the cut-resistant surfaces (i.e., bonding material surfaces) of examples 1–9 will have a lamination efficiency of at least 10 g/m$^2$ or pass as a result of incomplete peel.

Example 1

A 34.2 g/m$^2$ polypropylene scrim manufactured by Conwed Plastics®, Inc. having 25.59 strands per 10 cm in the machine direction and 31.50 strands per 10 cm in the cross machine direction was bonded to 100% SSK, 0.762 mm thick, 0.521 kg/m$^2$ paper manufactured by Georgia Pacific®, Inc. were used. The scrim and paper were placed in a platen press and subjected 2296 kPa pressure at 177° C. for 75 seconds.

Example 2

A 48.9 g/m$^2$ polypropylene scrim manufactured by Conwed Plastics®, Inc. having 20.51 strands per 10 cm in the machine direction and 23.62 strands per 10 cm in the cross machine direction was bonded to 100% SSK, 0.762 mm thick, 0.521 kg/m$^2$ paper manufactured by Georgia Pacific®, Inc. were used. The scrim and paper were placed in a platen press and subjected 2296 kPa pressure at 177° C. for 90 seconds.

Example 3

A 15 g/m$^2$ polypropylene carded nonwoven manufactured by The Stearns Technical Textiles Co.®, having a 9 denier fiber, was bonded to 100% SSK, 0.762 mm thick, 0.521 kg/m$^2$ paper manufactured by Georgia Pacific®, Inc. were used. The scrim and paper were placed in a platen press and subjected 2296 kPa pressure at 177° C. for 90 seconds.

Example 4

A 34.2 g/m$^2$ polypropylene scrim manufactured by Conwed Plastics®, Inc. having 25.59 strands per 10 cm in the machine direction and 31.50 strands per 10 cm in the cross direction was bonded to 100% SSK, 0.635 mm thick, 0.456 kg/m$^2$ paper manufactured by The Herty Foundation®, Inc. were used. The scrim and paper were placed in a platen press and subjected 2296 kPa pressure at 177° C. for 75 seconds.

Example 5

A 48.9 g/m$^2$ polypropylene scrim manufactured by Conwed Plastics®, Inc. having 20.51 strands per 10 cm in the machine direction and 23.62 strands per 10 cm in the cross direction was bonded to 100% SSK, 0.635 mm thick, 0.456 kg/m$^2$ paper manufactured by The Herty Foundation®, Inc. were used. The scrim and paper were placed in a platen press and subjected 2296 kPa pressure at 177° C. for 90 seconds.

Example 6

A 15 g/m$^2$ polypropylene carded nonwoven manufactured by The Stearns Technical Textiles Co.®, having a 9 denier fiber, was bonded to 100% SSK, 0.635 mm thick, 0.456 kg/m$^2$ paper manufactured by The Herty Foundation®, Inc. were used. The scrim and paper were placed in a platen press and subjected 2296 kPa pressure at 177° C. for 90 seconds

Example 7

A 34.2 g/m$^2$ polypropylene scrim manufactured by Conwed Plastics®, Inc. having 25.59 strands per 10 cm in the machine direction and 31.50 strands per 10 cm in the cross machine direction was bonded to 100% NSK, 0.559 mm thick, 0.406 kg/m$^2$ paper manufactured by The Smurfit Stone Container Corporation® were used. The scrim and paper were placed in a platen press and subjected 2296 kPa pressure at 177° C. for 75 seconds.

Example 8

A 48.9 g/m$^2$ polypropylene scrim manufactured by Conwed Plastics®, Inc. having 20.51 strands per 10 cm in the machine direction and 23.62 strands per 10 cm in the cross machine direction was bonded to 100% NSK, 0.559 mm thick, 0.406 kg/m² paper manufactured by The Smurfit Stone Container Corporation® were used. The scrim and paper were placed in a platen press and subjected 2296 kPa pressure at 177° C. for 90 seconds Example 9

A 15 g/m² polypropylene carded nonwoven manufactured by The Steams Technical Textiles Co.®, having a 9 denier fiber, was bonded to 100% NSK, 0.559 mm thick, 0.406 kg/m² paper manufactured by The Smurfit Stone Conainer Corporation® were used. The scrim and paper were placed in a platen press and subjected 2296 kPa pressure at 177° C. for 90 seconds.

TABLE 1

Tabulation of Paper, Absorbent Efficiency, Cut-resistance, and Lamination Efficiency for Examples 1–9.

| Paper | Absorbent Efficiency g²/(cm⁵sec) | Cut-resistance (kgf/cm) | Lamination Efficiency (grams/meter²) |
|---|---|---|---|
| Example 1 | 3.7 | 63.1 | Pass* |
| Example 2 | 4.5 | 53.4 | Pass* |
| Example 3 | 3.7 | 59.9 | Pass* |
| Example 4 | 1.9 | 58.3 | 375.8 |
| Example 5 | 2.4 | 49.7 | Pass* |
| Example 6 | 1.4 | 59.5 | Pass* |
| Example 7 | 1.7 | 62.0 | 118.9 |
| Example 8 | 1.6 | 56.9 | 145.4 |
| Example 9 | 0.8 | 76.2 | Pass* |

*Incomplete peel indicating well integrated bonding and absorbent layers.

The foregoing examples and descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, systems, configurations, methods, and potential applications have been described, it should be understood that many variations and alternatives could be utilized without departing from the scope of the invention.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that such modifications fall within the scope of the invention as defined by the claims appended hereto.

What is claimed is:

1. A cut-resistant and absorbent multi-purpose sheet comprising:
   (a) an absorbent material having a top layer and a bottom surface;
   (b) said top layer comprising an amalgamation of said absorbent material and a continuous sheet of bonding material;
   (c) a fluid impermeable material in contact with said bottom surface;
   wherein said bonding material has a basis weight in the range of 4 g/m² to about 100 g/m²; and,
   wherein said sheet material exhibits a lamination efficiency of at least 10 g/m².

2. The sheet material of claim 1, wherein said fluid impermeable material comprises a sheet attached to said bottom surface.

3. The sheet material of claim 1, wherein said bonding material has a laminated open area of at least 0.5 percent.

4. The sheet material of claim 1, wherein said bonding material comprises a substantially non-absorbent material having holes.

5. The sheet material of claim 1 wherein said bonding material has a basis weight of from about 15 g/m² to about 50 g/m².

6. The sheet material of claim 1, wherein said absorbent material comprises a fibrous material.

7. The sheet material of claim 6, wherein said absorbent material has a basis weight of from about 200 lb/3000 ft² (0.325 kg/m²) to about 400 lb/3000 ft² (0.651 kg/m²).

8. The sheet material of claim 7, wherein said absorbent material has a basis weight of from about 220 lb/3000 ft² (0.358 kg/m²) to about 280 lb/3000 ft² (0.456 kg/m²).

9. The sheet material of claim 1, wherein said sheet material is generally planar.

10. The sheet material of claim 1, wherein said absorbent material and said bonding material are coextensive with said impermeable material.

11. The sheet material of claim 1 further comprising at least one series of weaknesses wherein said at least one series of weaknesses is extensive through said bonding material and at least a portion of said absorbent material.

12. A multi-purpose sheet material comprising:
   (a) an absorbent material having opposing first and second surfaces;
   (b) an impermeable material in contact with said first surface of said absorbent material;
   (c) a bonding material in contact with said second surface of said absorbent material and forming an amalgamated layer therebetween; and,
   wherein said sheet material exhibits an absorbent efficiency of at least 0.2, a lamination efficiency of at least 10 g/m², and a slice resistance of at least 30 kgf/cm.

13. The sheet material of claim 12, wherein said bonding material forms a continuous network.

14. The sheet material of claim 12, wherein said bonding material comprises a synthetic material.

15. An absorbent, cut-resistant, and shred-resistant article, comprising:
   a sheet material, wherein the sheet material exhibits a cut-resistance of at least 30 kgf/cm, an absorbent efficiency of at least 0.2, and a lamination effiency of at least 10 g/m².

16. The article as recited in claim 15, wherein said sheet material comprises an absorbent material having a first surface and a second surface, a bonding material joined to said first surface of said absorbent material and forming an amalgamated layer therebetween, and an impermeable material joined to said second surface of said absorbent material.

17. The article as recited in claim 16, wherein said bonding material comprises a substantially non-absorbent material having holes.

18. The article as recited in claim 15 further comprising at least one series of weaknesses wherein said at least one series of weaknesses is extensive through said bonding material and at least a portion of said absorbent material.

19. The article as recited in claim 15, wherein said sheet material exhibits a lamination efficiency of at least 10 g/m².

20. The article as recited in claim 15, wherein said sheet material has a basis weight from 200 pounds per 3000 ft² (0.325 kg/m²) to 400 lb/3000 ft² (0.651 kg/m²).

* * * * *

UNITED STATES PATENT AND TRADEMARK OFFICE
CERTIFICATE OF CORRECTION

PATENT NO.   : 6,617,004 B1
DATED        : September 9, 2003
INVENTOR(S)  : Kirk Wallace Lake et al.

It is certified that error appears in the above-identified patent and that said Letters Patent is hereby corrected as shown below:

<u>Title page,</u>
Item [*] Notice, should read:
-- [*] Notice: Subject to any disclaimer, the term of this patent is extended
    or adjusted under 35 U.S.C. 154(b) by 59 days. --

Signed and Sealed this

Sixteenth Day of December, 2003

JAMES E. ROGAN
*Director of the United States Patent and Trademark Office*